US012633462B2

(12) United States Patent
Tatsuki et al.

(10) Patent No.: US 12,633,462 B2
(45) Date of Patent: May 19, 2026

(54) FILM FOR FILM CAPACITORS, METAL LAMINATE, FILM CAPACITOR, POWER CONTROL UNIT, ELECTRIC VEHICLE, AND ELECTRIC AIRCRAFT

(71) Applicant: Toray Industries, Inc., Tokyo (JP)

(72) Inventors: Toshiumi Tatsuki, Otsu (JP); Masatoshi Ohkura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 154 days.

(21) Appl. No.: 18/691,089

(22) PCT Filed: Sep. 16, 2022

(86) PCT No.: PCT/JP2022/034715
§ 371 (c)(1),
(2) Date: Mar. 12, 2024

(87) PCT Pub. No.: WO2023/042905
PCT Pub. Date: Mar. 23, 2023

(65) Prior Publication Data

US 2024/0379291 A1 Nov. 14, 2024

(30) Foreign Application Priority Data

Sep. 17, 2021 (JP) ................................ 2021-151881

(51) Int. Cl.
*H01G 4/18* (2006.01)
*H01G 4/08* (2006.01)

(52) U.S. Cl.
CPC ............... *H01G 4/18* (2013.01); *H01G 4/085* (2013.01)

(58) Field of Classification Search
CPC ........... H01G 4/18; H01G 4/085; H01G 4/32; H01G 4/33; B32B 15/08; B32B 27/00; B32B 27/08; B32B 27/281; B32B 27/285; B32B 27/286; B32B 27/302; B32B 27/308; B32B 27/34; B32B 27/36; B32B 27/365; B32B 27/38; B32B 27/40; C08J 7/04
See application file for complete search history.

(56) References Cited

U.S. PATENT DOCUMENTS

| | | | | |
|---|---|---|---|---|
| 2006/0141244 | A1* | 6/2006 | Hatada .................... | B32B 25/08 428/457 |
| 2007/0258190 | A1 | 11/2007 | Irwin et al. | |
| 2010/0177456 | A1 | 7/2010 | Miyamoto et al. | |
| 2011/0090618 | A1 | 4/2011 | Takeoka et al. | |
| 2015/0302990 | A1* | 10/2015 | Ghosh .................... | H01G 4/206 428/141 |
| 2020/0198298 | A1* | 6/2020 | Imanishi .................... | C08J 5/18 |
| 2021/0139700 | A1* | 5/2021 | Arimoto .............. | C09D 179/08 |
| 2021/0193388 | A1* | 6/2021 | Qi ........................... | H01G 4/20 |
| 2023/0079561 | A1 | 3/2023 | Tatsuki et al. | |

FOREIGN PATENT DOCUMENTS

| | | | | |
|---|---|---|---|---|
| CN | 115151989 | A | 10/2022 | |
| JP | H04219236 | A | 8/1992 | |
| JP | 2004090551 | A | 3/2004 | |
| JP | 2007300126 | A | 11/2007 | |
| JP | 2014118417 | A | 6/2014 | |
| JP | 2018163950 | A | 10/2018 | |
| JP | 2019172921 | A * | 10/2019 | |
| JP | 2021154734 | A | 10/2021 | |
| JP | 2021154735 | A * | 10/2021 | |
| JP | 2023044671 | A | 3/2023 | |
| KR | 100271923 | B1 * | 12/2000 | ............ B32B 27/18 |
| WO | 2007080757 | A1 | 7/2007 | |
| WO | 2009/060944 | A1 | 5/2009 | |
| WO | 2010004700 | A1 | 1/2010 | |

OTHER PUBLICATIONS

Maryam Mohammadi, et al., The glass transition temperature of PMMA: A molecular dynamics study and comparison of various determination methods, European Polymer Journal, vol. 91, 121-133 (Jun. 2017) (Year: 2017).*
International Search Report (PCT/ISA/210) with translation and Written Opinion (PCT/ISA/237) mailed on Nov. 22, 2022, by the Japanese Patent Office as the International Searching Authority for International Application No. PCT/JP2022/034715. (9 pages).
Kawamura et al., "Study of the Side-Chain Relaxation of Methacrylate Homopolymers and Copolymers by the Dielectric Method", Journal of Polymer Science: Part A-2, (Sep. 1969), vol. 7, Issue 9, pp. 1559-1575.

(Continued)

*Primary Examiner* — Timothy J. Dole
*Assistant Examiner* — Ester N Lian
(74) *Attorney, Agent, or Firm* — Buchanan Ingersoll & Rooney PC

(57) ABSTRACT

This film for film capacitors has two resin layers of different thicknesses, wherein, letting resin layer A be the layer with the smaller thickness and resin layer B be the layer with the larger thickness, the resin layer A is present on at least one side of the resin layer B. In addition, the film for film capacitors has an XA, which is determined using formula (i) from the atomic fractions for H, C, S, Si, N, and O in the resin layer A, of 0.050-0.80; has a loss tangent measured at 10 kHz and 23° C. of not more than 0.50%; and satisfies at least one of conditions 1 and 2.

XA=(atomic fraction for C+atomic fraction for N+atomic fraction for S+atomic fraction for Si)/(atomic fraction for H+atomic fraction for O). Formula (i)

Condition 1: The melting point measured by DSC is at least 180° C.

Condition 2: The glass transition temperature measured by DSC is at least 130° C. and not more than 370° C.

Provided is a film for film capacitors that has a high heat resistance and self-healing performance and that can reduce the decline in properties induced by heating when used in a capacitor.

15 Claims, No Drawings

(56) References Cited

OTHER PUBLICATIONS

Chinese Office Action of the corresponding Chinese Patent Application No. 202280051339.7, issued on Aug. 20, 2025, with English translation (14 pages).
Extended European Search Report (EESR) of the corresponding European Patent Application No. 22870052.2, issued on Aug. 28, 2025 (7 pages).

* cited by examiner

FILM FOR FILM CAPACITORS, METAL LAMINATE, FILM CAPACITOR, POWER CONTROL UNIT, ELECTRIC VEHICLE, AND ELECTRIC AIRCRAFT

CROSS REFERENCE TO RELATED APPLICATIONS

This is the U.S. National Phase application of PCT/JP2022/034715, filed Sep. 16, 2022 which claims priority to Japanese Patent Application No. 2021-151881, filed Sep. 17, 2021, the disclosures of each of these applications being incorporated herein by reference in their entireties for all purposes.

FIELD OF THE INVENTION

The present invention relates to a film for film capacitors as a dielectric for film capacitors, a metal laminate, a film capacitor, a power control unit, an electric vehicle, and an electric aircraft.

BACKGROUND OF THE INVENTION

In these years, the market for electric motor-driven hybrid vehicles such as hybrid electric vehicles (HEV) and plug-in hybrid electric vehicles (PHEV), or electric motor-driven vehicles such as electric vehicles (EV) and fuel cell vehicles (FCV) has expanded due to global environmental problems and the like, and with the expansion of the market for these electric motor-driven hybrid vehicles and electric motor-driven vehicles, the demand for film capacitors for use in these vehicles has been also increased rapidly.

The film capacitors are capacitors including a film made of a resin as a dielectric, which have excellent frequency characteristics and temperature stability. Examples of the film for the film capacitors include thermoplastic resin films such as a polypropylene (PP) resin film, polyester resin films such as a polyethylene terephthalate (PET) resin film and a polyethylene naphthalate (PEN) resin film and a polyphenylene sulfide (PPS) resin film, or a polyetherimide (PEI) resin film that is an amorphous thermoplastic resin film.

Among these films, the polyetherimide resin film has attracted attention (Patent Documents 1 and 2). This is because heat resistance that can withstand use under environments at 120° C. or higher may be required in the case of using the film capacitors for applications of hybrid vehicles and electric vehicles, and because the use of a film made of a polyetherimide resin with a glass transition temperature (Tg) of 200° C. or higher allows the achievement of excellent heat resistance and electrical characteristics such as withstand voltage characteristics and dielectric characteristics.

Films that have excellent heat resistance, such as a polyetherimide and a polyphenylene sulfide, however, typically have poor self-healing (SH) performance, and have the disadvantage that the use of the films for a long period of time will decrease the capacitances. In contrast, a technique of improving self-healing performance by providing a coating layer on a substrate film is known (Patent Document 3). In addition, the use of a film such as a polyetherimide or a polyethylene naphthalate as a film for capacitor has the risk of increasing heat generation, thereby degrading the performance.

PATENT DOCUMENTS

Patent Document 1: Japanese Patent Laid-open Publication No. 2007-300126

Patent Document 2: Japanese Patent Laid-open Publication No. 2018-163950

Patent Document 3: International Publication No. 2007/080757

SUMMARY OF THE INVENTION

Such prior art as shown in Patent Document 3 has, however, the problem of producing siloxane that may cause a conducting wire failure of an electric circuit at the time of dielectric breakdown, and impairing characteristics as a capacitor, because a silicone-based self-healing coating for use in achieving both heat resistance and self-healing performance contains Si. Thus, in view of the background of such prior art, the present invention aims to provide a film for film capacitors, which has high heat resistance and self-healing performance and can reduce performance degradation due to heat generation in the case of using as a capacitor.

The above-described problem can be solved by the following invention. More specifically, a film for film capacitors according to embodiments of the present invention is a film for film capacitors, including two types of resin layers that are different in thicknesses, where with the resin layer A of the two types of resin layers being a layer that is smaller in thickness and resin layer B thereof being a layer that is larger in thickness, the film for capacitors includes the resin layer A on at least one side of the resin layer B; has an XA of 0.050 or more and 0.80 or less calculated based on the following formula (i) from the atomic fractions for hydrogen atom H, carbon atom C, sulfur atom S, silicon atom Si, nitrogen atom N, and oxygen atom O contained in the resin layer A; has a dielectric loss tangent of 0.50% or less measured at 10 kHz under an atmosphere at 23° C.; and satisfies at least one of the following conditions 1 and 2.

$$XA = \text{(atomic fraction for carbon atom C + atomic fraction for nitrogen atom N + atomic fraction for sulfur atom S + atomic fraction for silicon atom Si)} / \text{(atomic fraction for hydrogen H + atomic fraction for oxygen atom O)} \quad \text{Formula (i)}$$

Condition 1: The melting point measured by DSC is 180° C. or higher.

Condition 2: The glass transition temperature measured by DSC is 130° C. or higher and 370° C. or lower.

According to the present invention, a film for film capacitors with high heat resistance and self-healing performance can be provided.

DETAILED DESCRIPTION OF EMBODIMENTS OF THE INVENTION

Hereinafter, a film for film capacitors according to embodiments of the present invention will be specifically described. The film for film capacitors according to embodiments of the present invention is a film for film capacitors, including two types of resin layers that are different in thicknesses, where with the resin layer A of the two types of resin layers being a layer that is smaller in thickness and resin layer B thereof being a layer that is larger in thickness, the film for capacitors includes the resin layer A on at least one side of the resin layer B; has an XA of 0.050 or more and 0.80 or less calculated based on the following formula (i) from the atomic fractions for hydrogen atom H, carbon atom C, sulfur atom S, silicon atom Si, nitrogen atom N, and oxygen atom O contained in the resin layer A; has a dielectric loss tangent of 0.50% or less measured at 10 kHz under an atmosphere at 23° C.; and satisfies at least one of the following conditions 1 and 2.

$$XA = \text{(atomic fraction for carbon atom C + atomic fraction for nitrogen atom N + atomic fraction for sulfur atom S + atomic fraction for silicon atom Si)} / \text{(atomic fraction for hydrogen H + atomic fraction for oxygen atom O)} \quad \text{Formula (i)}$$

Condition 1: The melting point measured by DSC is 180° C. or higher.

Condition 2: The glass transition temperature measured by DSC is 130° C. or higher and 370° C. or lower.

The film for film capacitors according to embodiments of the present invention has the two types of resin layers that are different in thicknesses. In this regard, "being different in thickness" refers to the fact that the difference in thickness is 0.10 μm or more, and the "two types of resin layers" refers to two resin layers that are different in composition from each other. The resin layer refers to a layer containing a resin as a main component, and the main component refers to a component contained in the layer in an amount of more than 50% by mass and 100% by mass or less (hereinafter, main components can be interpreted in the same manner). In addition, "being different in composition" refers to the fact that the components constituting the respective layers are different from each other at 10% by mass or more and 100% by mass or less, and preferably refers to the fact that the main components are different.

It is important for the film for film capacitors according to embodiments of the present invention to include, with the resin layer A of the two types of resin layers being a layer that is smaller in thickness and resin layer B thereof being a layer that is larger in thickness, the resin layer A on at least one side of the resin layer B; and have an XA of 0.050 or more and 0.80 or less calculated based on the following formula (i) from the atomic fractions for hydrogen atom H, carbon atom C, sulfur atom S, silicon atom Si, nitrogen atom N, and oxygen atom O contained in the resin layer A.

$$XA = \text{(atomic fraction for carbon atom C + atomic fraction for nitrogen atom N + atomic fraction for sulfur atom S + atomic fraction for silicon atom Si)} / \text{(atomic fraction for hydrogen H + atomic fraction for oxygen atom O)} \quad \text{Formula (i)}$$

XA is a ratio between atoms that have a tendency to be less likely to evaporate at the time of dielectric breakdown and atoms that have a tendency to be more likely to evaporate in the resin layer A, and XA of 0.80 or less enhances the self-healing performance and the reliability of the capacitor, whereas XA of 0.050 or more allows, when a metal layer is laminated, the metal layer to be kept from undergoing oxidative deterioration. From the viewpoint mentioned above, XA is preferably 0.70 or less, more preferably 0.65 or less, still more preferably 0.60 or less, particularly preferably 0.55 or less. In contrast, from the viewpoint of ease of realization, XA is preferably 0.20 or more, more preferably 0.40 or more. The atom content in the resin layer A can be determined from an atomic fraction obtained through analysis by Rutherford backscattering/hydrogen forward scattering simultaneous spectrometry (Pelletron 3SDH manufactured by National Electrostatics Corporation), and the detailed procedure will be described later.

The film for film capacitors according to embodiments of the present invention satisfies at least one of the following conditions 1 and 2. Condition 1: The melting point measured by DSC is 180° C. or higher. Condition 2: The glass transition temperature measured by DSC is 130° C. or higher and 370° C. or lower. It is to be noted that hereinafter, the melting point measured by DSC and the glass transition temperature measured by DSC may be respectively referred to simply as a "melting point" and a "glass transition temperature".

The film for film capacitors according to embodiments of the present invention satisfies at least one of the conditions 1 and 2, thereby making insulation failures due to thermal shrinkage or film breakage less likely to be caused in the case of using as a film capacitor. From the viewpoint mentioned above, the melting point is preferably 205° C. or higher, more preferably 215° C. or higher. In contrast, from the viewpoint of molding processability, the melting point is preferably 370° C. or lower, more preferably 360° C. or lower. From the viewpoint mentioned above, the glass transition temperature is preferably 150° C. or higher, more preferably 165° C. or higher, still more preferably 180° C. or higher. In contrast, from the viewpoint of molding processability, the glass transition temperature is preferably 350° C. or lower.

The melting point used herein is the highest melting peak temperature among melting peak temperatures determined, based on the method described in JIS K-7122 (1987), in a differential scanning calorimetry chart obtained by heating the film for film capacitors at a heating rate of 20° C./min and the resin at a heating rate of 20° C./min from 25° C. up to Tmax [° C.] in accordance with JIS K-7121 (1987). Further, Tmax [° C.] was initially set to 350° C. for measurement, and when no melting point was observed, set to 380° C. for measurement again. When no melting point was observed at Tmax=380° C., no melting point was determined.

The glass transition temperature used herein is the highest intermediate glass transition temperature among intermediate glass transition temperatures determined, based on the method described in JIS K-7122 (1987), in a differential scanning calorimetry chart of 2nd RUN obtained by heating the film for film capacitors at a heating rate of 20° C./min and the resin at a heating rate of 20° C./min from 25° C. to Tmax [° C.] (1st Run), holding the state for 5 minutes, then rapidly cooling to reach 25° C. or lower, and again heating the resin at a heating rate of 20° C./min from 25° C. to Tmax [° C.] (2nd Run) in accordance with JIS K-7121 (1987). Further, Tmax [° C.] was initially set to 350° C. for measurement, and when no glass transition temperature was observed, set to 380° C. for measurement again. When no glass transition temperature was observed at Tmax=380° C., no glass transition temperature was determined.

The means for causing the film for film capacitors according to embodiments of the present invention to satisfy at least one of the conditions 1 and 2 is not particularly limited, and examples thereof include a method of selecting, as a raw material for the resin layer B, a material that satisfies at least one of the conditions 1 and 2, and making the thickness of the resin layer A 30% or less of the thickness of the resin layer B. In addition, the examples also include a method of selecting a material that satisfies at least one of the conditions 1 and 2 as a raw material for the resin layer A and the resin layer B.

The resin layer B preferably satisfies at least one of the conditions 1 and 2 from a viewpoint of enhancing the heat resistance in the case of using as a capacitor. Satisfying at least one of the conditions 1 and 2, thereby making insulation failures due to thermal shrinkage or film breakage less likely to be caused in the case of using as a film capacitor. From the viewpoint mentioned above, the melting point is preferably 205° C. or higher, more preferably 215° C. or higher. In contrast, from the viewpoint of molding processability, the melting point is preferably 370° C. or lower, more preferably 360° C. or lower. From the viewpoint mentioned above, the glass transition temperature is preferably 150° C. or higher, more preferably 165° C. or higher, still more preferably 180° C. or higher. In contrast, from the viewpoint of molding processability, the glass transition temperature is preferably 370° C. or lower, more preferably 350° C. or lower. The melting point and glass transition temperature of the resin layer B can be measured in the same manner as in the method for measuring the melting point and glass transition temperature of the film as described later, except for using 3.0 mg scraped from the resin layer B instead of 3.0 mg of the film.

It is important for the film for film capacitors according to embodiments of the present invention to have a dielectric loss tangent of 0.50% or less measured at 10 kHz under an atmosphere at 23° C. The dielectric loss tangent of 0.50% or less allows heat generation in the case of using as a capacitor to be reduced, and reduces performance degradation due to heat generation. From the viewpoint mentioned above, the dielectric loss tangent is preferably 0.30% or less. The lower limit of the dielectric loss tangent is not particularly limited, but is preferably 0.0010% from the viewpoint of feasibility, and also in consideration of manufacturing cost, is more preferably 0.010%, particularly preferably 0.10%.

The method for setting the dielectric loss tangent of the film for film capacitors according to embodiments of the present invention to 0.50% or less is not particularly limited, but can be achieved by, for example, forming the resin layer B from a raw material that is 0.50% or less in dielectric loss tangent, and forming the resin layer A on one surface of the resin layer B to have a thickness within a range described later. It is to be noted that the dielectric loss tangent used herein refers to a value measured in accordance with JIS C2138-2007, and a detailed measurement method therefor will be described later.

When the film for film capacitors according to embodiments of the present invention is subjected to a pyrolysis GC-MS measurement at 400° C. under the conditions described later, the film preferably has a peak with an intensity of 25000 or more in a section of 2 minutes or more and 20 minutes or less in retention time. The section described above more preferably includes a peak with an intensity of 50000 or more, still more preferably includes a peak with an intensity of 90000 or more, particularly preferably includes a peak with an intensity of 210000 or more. The number of peaks included in the section may be one or more. Including a peak with an intensity of 25000 or more means that the film contains therein a component that evaporates at the time of dielectric breakdown in a large amount, and such an aspect allows the self-healing performance of the film for capacitors to be enhanced. Examples of the method of causing the section mentioned above to have a peak with an intensity of 25000 or more include a method of employing an aspect in which the dielectric loss tangent is adjusted to the range mentioned above, and the thin resin layer A contains a component that is likely to evaporate at the time of dielectric breakdown.

From the viewpoint of improving the self-healing performance, the film for film capacitors according to embodiments of the present invention preferably has a 10% by mass decrease temperature of 390° C. or lower when the rate of change in thermogravimetric weight of the resin layer A is measured at a heating rate of 10° C./min under a nitrogen atmosphere. Hereinafter, the 10% by mass decrease temperature in the case of measuring the rate of change in thermogravimetric weight of the resin layer A at a heating rate of 10° C./min under a nitrogen atmosphere may be referred to as a "10% by mass decrease temperature of the resin layer A". From the viewpoint mentioned above, the 10% by mass decrease temperature of the resin layer A is more preferably 355° C. or lower, still more preferably 325° C. or lower, particularly preferably 295° C. or lower. The fact that the 10% by mass decrease temperature of the resin layer A is 390° C. or lower or within the preferred range mentioned above means that the film for capacitors (particularly, the resin layer A) contains therein a component that evaporates at the time of dielectric breakdown in a large amount, and such an aspect allows the self-healing performance of the film for capacitors to be improved.

The 10% by mass decrease temperature of the resin layer A can be measured by the following procedure. First, a sample of the resin layer A is stored in an environment at 23° C. and 50% RH for 24 hours, and the stored sample is heated from 23° C. to 500° C. at a heating rate of 10° C./min under a nitrogen atmosphere in a thermogravimetric analyzer to measure a change in thermogravimetric weight. From the obtained change in thermogravimetric weight, the thermogravimetric weight change rate at each temperature is determined with the thermogravimetric weight at 170° C. as 100% by mass, and the temperature at which the thermogravimetric weight is 90% by mass is regarded as the 10% by mass decrease temperature of the resin layer A. It is to be noted that the analyzer can be selected appropriately from known analyzers as long as the analyzers are capable of performing the measurement in accordance with the procedure mentioned above, and for example, TGA-50 (manufactured by SHIMADZU CORPORATION) and the like can be used.

Examples of the method for setting the 10% by mass decrease temperature of the resin layer A to 390° C. or lower include a method of using, for the resin layer A, a raw material with which the 10% by mass decrease temperature in the case of measuring the rate of change in thermogravimetric weight is measured is 390° C. or lower. Examples of such a raw material include a urethane acrylate polymer, an acrylate polymer, a urethane methacrylate polymer, a methacrylate polymer, an aliphatic polyether, an aliphatic polyester, an aliphatic polyamide, a polyurethane, and a polyurea.

From the viewpoint of improving the self-healing performance, the film for fill capacitors according to the present invention preferably has a 1% by mass decrease temperature of 430° C. or lower when the rate of change in thermogravimetric weight is measured at a heating rate of 10° C./min under a nitrogen atmosphere. It is to be noted that the 1% by mass decrease temperature in the case of measuring the rate of change in thermogravimetric weight at a heating rate of 10° C./min under a nitrogen atmosphere may be referred to as a "1% by mass decrease temperature of the film". From the viewpoint mentioned above, the 1% by mass decrease temperature of the film is more preferably 380° C. or lower, still more preferably 370° C. or lower, particularly preferably 355° C. or lower, most preferably 340° C. or lower. The fact that the 1% by mass decease temperature of the film is 430° C. or lower or within the preferred range mentioned above means that the film for capacitors contains therein a component that evaporates at the time of dielectric breakdown in a large amount, and when the thickness of the resin layer A is large, particularly when the thickness of the resin layer A is designed to be 5% or more of the thickness of the entire film, such an aspect allows the self-healing performance of the film for capacitors to be improved.

The 1% by mass decrease temperature of the film can be measured in the same manner as the above-described 10% by mass decrease temperature of the resin layer A, except that the sample to be subjected to measurement is the film and that the temperature to be read is a temperature at which the thermogravimetric weight is 99% by mass. As a method for setting the 1% by mass decrease temperature of the film to 430° C. or lower, it is preferable to control the temperature with the design of the resin layer A from the viewpoint of keeping the dielectric loss tangent within the range mentioned above, and examples thereof include a method of using, as a raw material for the resin layer A, a raw material that has a low 10% by mass decrease temperature in the case of measuring the rate of change in thermogravimetric weight, and a method of increasing the thickness of the resin layer A. Designing the resin layer A by the method mentioned above increases the decomposition amount of the resin layer A at 430° C. or lower in the case of heating the film, and also increases the mass decrease of the film.

The film for film capacitors according to the present invention preferably has the resin layer A including any of partial structures represented by structures r1 to r8 as a constituent unit (n is an integer of 1 or more). "Including any of the partial structures represented by the structures r1 to r8 as a constituent unit" means that at least one resin of resins constituting the resin layer A includes the partial structures represented by the structures r1 to r8. It is to be noted that the partial structure refers to a group of atoms chemically bonded that partially or entirely constitutes the molecular structure. In this case, the resin layer A may contain two or more components including the same partial structure or different partial structures represented by the structures r1 to r8, or a component including two or more partial structures represented by the structures r1 to r8 in one molecule. The partial structures represented by the structures r1 to r8 are structures that are likely to evaporate at the time of dielectric breakdown, and including the resin layer A that has the structure allows the self-healing performance of the film for film capacitors to be enhanced.

[Chemical Formula 1]

Structure r1

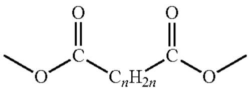

Structure r2

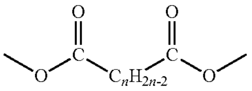

Structure r3

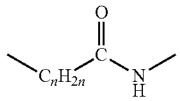

Structure r4

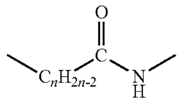

Structure r5

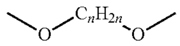

Structure r6

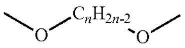

Structure r7

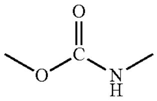

Structure r8

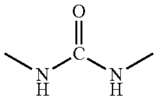

As for the content of the partial structures represented by the structures r1 to r8, the proportion of the mass of the partial structures in the resin layer A corresponding to the structures r1 to r8 is denoted by $W_R$ when the mass of the resin layer A is regarded as 100% by mass. From the viewpoint of self-healing performance, $W_R$ is preferably 5.0% by mass or more, more preferably 15% by mass or more, still more preferably 45% by mass or more. In addition, the upper limit of $W_R$ is not particularly limited, but is 100% by mass from the viewpoint of feasibility. Similarly, when the mass of the resin layer A is regarded as 100% by mass, the proportion of the mass of the partial structure in the resin layer A corresponding to at least one structure selected from the group of the structures r5, r7, and r8 is denoted by $W_{578}$, and the proportion of the mass of the partial structure in the resin layer A corresponding to at least one of the structure r7 or r8 is denoted by $W_{78}$.

From the viewpoint of self-healing performance, the resin layer A preferably contains at least one structure selected from the group of the structures r5, r7, and r8 that are more likely to evaporate among the partial structures represented by the structures r1 to r8, more preferably contains at least one structure of the structure r7 or r8 that is particularly likely to evaporate. From the same viewpoint, $W_{578}$ is more preferably 1% by mass or more, more preferably 10% by mass or more. $W_{78}$ is still more preferably 1% by mass or more, particularly preferably 10% by mass or more. In addition, the upper limits of $W_{578}$ and $W_{78}$ are not particularly limited, but are both 100% by mass from the viewpoint of feasibility.

When the raw material composition is unknown, whether the resin layer A includes therein the partial structures represented by the structures r1 to r8 or not can be determined from analysis of a sample scraped from the resin layer A by a known analysis method such as solid $^{1}H$-nuclear magnetic resonance (NMR), solid $^{13}C$-nuclear magnetic resonance (NMR), or pyrolysis gas chromatography mass spectrometry (GC-MS). The analysis can be performed in accordance with the following procedure.

Quantification of the structures r1 to r4 will be described. First, the value of n of the structure is determined by pyrolysis GC-MS. Subsequently, the number of hydrogen atoms bonded to carbon adjacent to the carbonyl carbon of the structure is quantified from the areas of the peaks detected at 2.0 to 2.8 ppm by solid $^{1}H$-NMR analysis of a DD/MAS method (Dipolar Decoupling/Magic Angle Spinning). The number of the other atoms of the structure was calculated from the obtained number of hydrogen atoms, and used for calculation of $W_R$. Which peak corresponds to the hydrogen atoms on the carbon adjacent to the carbonyl carbon of the structure among the peaks detected at 2.0 to 2.8 ppm is determined by solid $^{1}H$—$^{13}C$ Cross-polarization-Heteronuclear Single Quantum Correlation (CP-HSQC).

Quantification of the structures r5 and r6 will be described. The value of n of the structure was determined by pyrolysis GC-MS. Subsequently, the number of hydrogen atoms bonded to carbon adjacent to the ether-bonded oxygen of the structure is quantified from the areas of the peaks detected at 3.5 to 4.5 ppm by solid $^{1}H$-NMR analysis of the DD/MAS method, and the number of the other atoms of the structure is calculated from the obtained number of hydrogen atoms, and used for calculation of $W_R$ and $W_{578}$. Which peak corresponds to the hydrogen atoms on the carbon adjacent to the ether-bonded oxygen of the structure among the peaks detected at 3.5 to 4.5 ppm is determined by solid $^{1}H$—$^{13}C$ Cross-polarization-Heteronuclear Single Quantum Correlation (CP-HSQC).

Quantification of the structures r7 and r8 will be described. The number of the carbonyl carbon atoms of the structure is quantified from the areas of the peaks detected at 150 to 160 ppm by solid $^{13}C$-NMR analysis of the DD/MAS method. The number of the other atoms of the structure is calculated from the obtained number of carbon atoms, and used for calculation of $W_R$, $W_{578}$, and $W_{78}$.

The raw material for the resin layer A in the film for capacitors according to the present invention is not to be considered particularly limited, but it is preferable to contain at least one compound from the group consisting of a urethane acrylate polymer, an acrylate polymer, a urethane methacrylate polymer, a methacrylate polymer, an aliphatic polyether, an aliphatic polyester, an aliphatic polyamide, a polyurethane, and a polyurea from the viewpoint of setting XA to 0.050 or more and 0.80 or less and enhancing the self-healing performance. Above all, it is more preferable to contain at least one compound from the group consisting of a urethane acrylate polymer, a urethane methacrylate polymer, a polyurethane, and a polyurea from the viewpoint of containing a urethane bond or a urea bond that has a tendency to decrease the decomposition temperature and enhancing the self-healing performance, and it is still more preferable to contain at least one of a urethane acrylate polymer or a urethane methacrylate polymer from the viewpoint of enhancing the wet heat resistance. The urethane acrylate polymer refers to a compound obtained by polymerization of an acrylate including a urethane bond. The acrylate polymer refers to a compound obtained by polymerization of an acrylate, other than the urethane acrylate polymer. The aliphatic polyether, the aliphatic polyester, and the aliphatic polyamide refer to compounds that have structures where aliphatic hydrocarbon groups are connected respectively by an ether bond, an ester bond, or an amide bond.

Two or more compounds of the compound group mentioned above may be selected and mixed, or at least one compound including two or more constituent units of the compound group may be contained. The constituent units of the compound group refer to the following structures. The urethane acrylate polymer and urethane methacrylate polymer of the compound group mentioned above have two structures as constituent units, and when the urethane acrylate polymer and the urethane methacrylate polymer each include both the two structures, the urethane acrylate polymer and the urethane methacrylate polymer each include one constituent unit of the compound mentioned above. In addition, in the case of a compound that have multiple constituent units, it is determined whether each compound is applicable, and for example, a resin layer containing a compound that has the structure 1, the structure 2, and the structure 3 as constituent units is treated as containing a urethane acrylate polymer, an acrylate polymer, a urethane methacrylate polymer, and a methacrylate polymer. The compound mentioned above may contain therein a component that includes a structure other than the following structures. The resin layer A preferably contains therein a compound including the compound group mentioned above such that the ratio by mass $W_A$ of components corresponding to the following structure 1 to 7 is 1% by mass or more when the mass of the resin layer A is regarded as 100% by mass. The mass of X, Y, and Z moieties of the structure 1 to 6 is, however, not included in $W_A$. The $W_A$ is preferably 5% by mass or more, more preferably 10% by mass or more, particularly preferably 40% by mass or more. In addition, the upper limit of $W_A$ is not particularly limited, but is theoretically 100% by mass.

Urethane acrylate polymer: structure 1 and structure 2
Acrylate polymer: structure 1
Urethane methacrylate polymer: structure 2 and structure 3
Methacrylate polymer: structure 3
Aliphatic polyether: structure 4
Aliphatic polyester: structure 5
Aliphatic polyamide: structure 6
Polyurethane: structure 2
Polyurea: structure 7

[Chemical Formula 2]

Structure 1

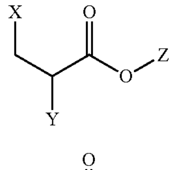

Structure 2

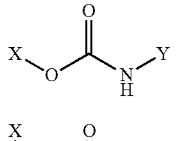

Structure 3

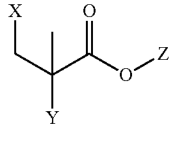

-continued

Structure 4

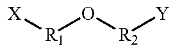

Structure 5

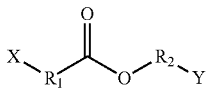

Structure 6

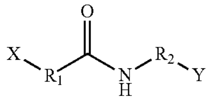

Structure 7

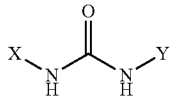

Further, n is an integer of 1 or more. $R_1$ and $R_2$ refer to an aliphatic hydrocarbon group, and X, Y, and Z each refer to any chemical structure. Some of these groups and structure may have the same chemical structure, or the groups and structures all may have different chemical structures.

Whether the resin layer A contains the constituent unit mentioned above or not can be analyzed with the use of, for example, a method commonly used for structural analysis of polymers, such as $^1$H-NMR (referred to also as nuclear magnetic resonance), time-of-flight secondary ion mass spectrometry (referred to also as TOF-SIMS), or Fourier transform infrared spectroscopy (referred to also as FT-IR).

The raw material that is used for the resin layer B of the film for film capacitors according to the present invention is not to be considered particularly limited, and examples thereof include: polyolefins such as a polystyrene (PS), a polymethylpentene (PMP), a cyclic olefin (COP), and cyclic olefin copolymers (COC); polyesters such as a polyethylene terephthalate (PET), a polybutylene terephthalate (PBT), and a polyethylene nalephthalate (PEN); polyamides such as polyamide 6 (PA6), polyamide 66 (PA66), polyamide 46 (PA46), polyamide 4T (PA4T), polyamide 6T (PA6T), modified polyamide 6T (modified PA6T), polyamide 9T (PA9T), polyamide 10T (PA10T), and polyamide 11T (PA11T); polysulfones such as a polysulfone (PSU), a polyethersulfone (PES), and a polyphenylsulfone (PPSU); polyarylene sulfides such as a polyphenylene sulfide (PPS), a polyphenylene sulfide ketone, a polyphenylene sulfide sulfone, and a polyphenylene sulfide ketone sulfone; polyimides (PI) such as a polyimide (PI), a polyetherimide (PEI), and a polyamideimide (PAI); polyaryletherketones such as a polyetherketone (PEK), a polyetheretherketone (PEEK), a polyetherketoneketone (PEKK), a polyetheretherketoneketone (PEEKK), and a polyetherketoneetherketoneketone (PEKEKK); fluorine-based polymers such as a polytetrafluoroethylene (PTFE) (referred to also as an ethylene tetrafluoride), a polytetrafluoroethylene-perfluoroalkylvinylether copolymer (PFA) (referred to also as an ethylene tetrafluoride-perfluoroalkylvinylether copolymer), a tetrafluoroethylene-hexafluoropropylene copolymer (FEP) (referred to also as an ethylene tetrafluoride-hexafluoropropylene copolymer), a tetrafluoroethylene-ethylene copolymer (ETFE) (referred to also as an ethylene tetrafluoride-ethylene copolymer), a polychlorotrifluoroethylene (PCTFE) (referred to also as an ethylene trifluoride chloride), a polyvinylidene fluoride (PVDE) (referred to also as a vinylidene fluoride), and a vinylidene fluoride-tetrafluoroethylene-hexafluoropyrene copolymer; polyacetals; liquid crystal polymers (LCP); polycarbonates (PC); polyarylates (PAR); phenol resins; polyurea; melamine resins, epoxy resins; alkyd resin; a mixture of syndiotactic polystyrene and polyphenylene ether; and polyurethane.

Among these examples, it is preferable to use a polyetherimide, a polycarbonate, a polyarylene sulfide, polysulfones such as a polyethersulfone and a polyphenylsulfone, a polyimide, a polymethylpentene, a polyetheretherketone, a polyetherketoneketone, a polyaryletherketone, a fluorene-containing polyester, a syndiotactic polystyrene, a mixture of syndiotactic polystyrene and polyphenylene ether, and a polyurethane that satisfy at least one of the condition 1 and condition 2 satisfied by the capacitor film according to embodiments of the present invention and have excellent heat resistance at 150° C.

In addition, it is particularly preferable for the resin layer B contains at least one resin of a polyarylene sulfide, a polyethersulfone, a polysulfone, and a polyimide, with the total amount thereof being 50% by mass or more and 100% by mass or less, from the viewpoint of reducing the dielectric loss tangent to suppress heat generation in the case of using as a capacitor while causing at least one of the melting point and glass transition temperature of the film for film capacitors to meet the condition mentioned above to enhance the heat resistance. From the viewpoint mentioned above, the total amount of the polyarylene sulfide and the polyimide is more preferably 70% by mass or more, still more preferably 90% by mass or more. These resins may be homopolymers, and modified products and derivatives thereof, and copolymers obtained with other compounds can also be used. In addition, the resins may be used alone, or two or more thereof can be used in mixture. Further, the copolymer of polyarylene sulfide herein refers to a copolymer including, based on all constituent units constituting the resin considered as 100 mol %, an arylene sulfide unit in an amount of more than 50 mol % and less than 100 mol % and other constituent units in an amount of more than 0 mol % and less than 50 mol %. The copolymer of polyimide can be also interpreted in the same manner.

The film for film capacitors according to the present invention may contain, as long as the properties thereof are not impaired, an antioxidant, a light stabilizer, an ultraviolet absorber, a plasticizer, a lubricant, a crosslinking agent, a flame retardant, an antistatic agent, a heat resistance improver, a colorant, a slipping agent, an antiblocking agent, inorganic particles, resin particles, an inorganic compound, an organic compound, and the like. Further, as necessary, these respective components may be used alone, or two or more thereof may be combined, and the components can be used for any of the resin layer A and the resin layer B.

The thickness of the resin layer A in the film for capacitors according to the present invention is preferably 1.0 nm or more and 500 nm or less. The thickness of the resin layer A is 1.0 nm or more, thereby allowing the self-healing performance to be enhanced, and the thickness is 500 nm or less, thereby making it easier to keep the dielectric loss tangent within the range mentioned above. From the viewpoint mentioned above, the thickness of the resin layer A is more preferably 200 nm or less. Similarly, from the viewpoint mentioned above, the thickness of the resin layer A is more preferably 5.0 nm or more, still more preferably 15 nm or more.

In general, raw materials that are lower in XA are known to have a tendency to be higher in dielectric loss tangent. Thus, originally, due to heat generation increased in the case of using as a capacitor, the film is not suitable for use as a capacitor as described above. According to embodiments of the present invention, however, the use of the raw material as the resin layer A that is thinner than the resin layer B allows heat generation in the case of using as a capacitor to be suppressed while enhancing the self-healing performance. In particular, keeping the thickness of the resin layer A within the range mentioned above allows the heat generation to be further reduced.

The thickness of the resin layer B is not to be considered particularly limited as long as the thickness is larger than that of the resin layer A, but is preferably 0.50 um or more and 9.0 μm or less. The thickness of the resin layer B is 9.0 μm or less, thereby making it easy to reduce the size of a film capacitor in the case of using as a film for film capacitors. The thickness of the resin layer B is 0.50 μm or more, thereby making it possible to reduce film breakage that is caused in processing the film for film capacitors is into a film capacitor. From the viewpoint mentioned above, the thickness of the resin layer B is preferably 7.5 μm or less, more preferably 5.5 μm or less, still more preferably 4.5 μm or less. The thickness of the resin layer B is preferably 1.0 μm or more, more preferably 1.5 μm or more.

In this regard, the thickness of each layer can be measured by observing a cross section in the width direction-thickness direction with a field emission scanning electron microscope with a function of measuring the length, and the detailed procedure will be described later.

The arithmetic mean roughness Sa of at least one surface of the film for film capacitors according to the present invention is preferably 5.0 nm or more and 1000 nm or less, more preferably 5.0 nm or more and 300 nm or less, from the viewpoint of processability into a capacitor. The at least one surface has Sa of 5.0 nm or more, thereby allowing slippage to be imparted to the film for film capacitor, and facilitating processing into a film capacitor. The at least one surface has Sa of 1000 nm or less, thereby allowing the withstand voltage in the case of a film capacitor to be increased. The method for keeping Sa within this range is not to be considered particularly limited, but in order to increase Sa, it is effective to add particles to the resin layer B, to add two components to be phase-separated to the resin layer A, or the like. Conversely, in order to decrease Sa, it is effective to perform extrusion molding on a smooth mirror surface roll, to form the resin layer B on a smooth film for solution deposition substrates, or the like. From the viewpoint of imparting slippage to the film for film capacitors according to embodiments of the present invention, the film for film capacitors according to embodiments of the present invention more preferably has Sa of 5.0 nm or more and 1000 nm or less at both surfaces, still more preferably has Sa of 5.0 nm or more and 300 nm or less at the both surfaces.

Hereinafter, a metal laminate for film capacitors according to embodiments of the present invention will be described. The metal laminate according to embodiments of the present invention has a metal layer on at least one surface of the film for film capacitors from the viewpoint of integration. In addition, for the purpose of enhancing the self-healing performance, the metal laminate more preferably has the resin layer B, the resin layer A, and the metal layer in this order. In this regard, "having the resin layer B, the resin layer A, and the metal layer in this order" refers to a general aspect in which the resin layer B, the resin layer A, and the metal layer are located in this order, and it does not matter whether or not there is another layer between the resin layer B and the resin layer A, between the resin layer A and the metal layer, or outside the resin layer B or the metal layer.

The thickness of the metal layer is preferably 1 nm or more and 100 nm or less, more preferably 5 nm or more and 80 nm or less, still more preferably 10 nm or more and 50 nm or less. The surface resistance value of the metal layer preferably falls within the range of 0.1 Ω/sq or more and 10 Ω/sq or less, more preferably 2 Ω/sq or more and 8 Ω/sq or less, still more preferably 3 Ω/sq or more and 6 Ω/sq or less. This is because the self-healing performance is degraded when the surface resistance value of the metal layer is less than 0.1 Ω/sq, which is not preferred. In contrast, this is based on the reason that the dielectric loss tangent may be decreased in the case of exceeding 10 Ω/sq. Further, for adjusting the surface resistance value of the metal layer, the thickness of the metal layer may be adjusted.

The film for film capacitors according to embodiments of the present invention is preferably used as a dielectric film for capacitors, but it is not to be considered limited by the capacitor type. Specifically, the film may be used for any of a foil-wound capacitor and a metal deposited film capacitor from the viewpoint of electrode configuration, and is also preferably used for an oil-impregnated capacitor impregnated with an insulating oil or a dry capacitor without any insulating oil used at all. In addition, the form of the capacitor may be a wound type or a laminated type. Among these capacitors, from the viewpoint of the characteristics of the film according to embodiments of the present invention, the film is preferably used as a metal-deposited film capacitor including the metal laminate. As a method for forming the metal layer, for example, a vacuum deposition method, a sputtering method, an ion plating method, a plating method, or the like is used. Among these methods, the vacuum deposition method with excellent productivity is preferred. When the metal layer is deposited, an oil method, a tape, or the like is used as a vapor deposition method. The deposition pattern of the metal layer is not to be considered particularly limited, but preferred patterns include a T-margin pattern, a honeycomb pattern, and a mosaic pattern.

The metal component of the metal layer is not to be considered particularly limited, but aluminum or an alloy of aluminum and zinc is preferably used. In addition, another metal component such as nickel, copper, gold, silver, and chromium deposited simultaneously with or sequentially to aluminum can also be used as the metal layer. In addition, on the deposited film, a protective layer can also be provided with the use of an oil or the like. In the case of performing the metal layer lamination on the film including the resin layer A and the resin layer B by vapor deposition, the vapor deposition surface of the film for film capacitors may be subjected to a surface treatment such as a corona discharge treatment before the vapor deposition. Performing such a surface treatment can enhance the adhesion of the deposited metal to the surface.

Next, a film capacitor according to the present invention will be described. The film capacitor according to embodiments of the present invention is obtained by using the metal laminate according to embodiments of the present invention. The film capacitor according to embodiments of the present invention can serve as a part of an automotive inverter and/or converter (for example, an inverter for a hybrid electric vehicle, a converter for a hybrid electric vehicle, an inverter for an electric vehicle, a converter for an electric vehicle, or the like.).

Hereinafter, a power control unit, an electric vehicle, and an electric aircraft according to the present invention will be described. The power control unit according to embodiments of the present invention includes the film capacitor according to embodiments of the present invention. The power control unit is a system that manages power in an electric vehicle, an electric aircraft, or the like that has a mechanism driven by electric power. Installing the film capacitor according to embodiments of the present invention in the power control unit allows the power control unit itself be reduced in size, improved in heat resistance and increased in efficiency, and as a result to improve the fuel efficiency.

The electric vehicle according to embodiments of the present invention includes the power control unit according to embodiments of the present invention. In this regard, the electric vehicle refers to an automobile that has a mechanism driven by electric power, such as an electric vehicle, a hybrid vehicle, and a fuel cell vehicle. As described above, the power control unit according to embodiments of the present invention can be reduced in size and is also excellent in heat resistance and efficiency, and thus, the electric vehicle including the power control unit according to embodiments of the present invention leads to an improvement in fuel efficiency and the like.

The electric aircraft according to embodiments of the present invention includes the power control unit according to embodiments of the present invention. In this regard, the electric aircraft refers to an aircraft that has a mechanism driven by electric power, such as a manned electric aircraft and a drone. As described above, the power control unit according to embodiments of the present invention can be reduced in size and is also excellent in heat resistance and efficiency, and thus, the electric air craft including the power control unit according to embodiments of the present invention leads to an improvement in fuel efficiency and the like.

Next, an example of a method for manufacturing a film for film capacitors according to embodiments of the present invention will be described. It is to be noted that while the following example has a two-layer structure composed of the resin layer A and the resin layer B, the film for film capacitors according to embodiments of the present invention may have a two-layer structure or have a structure of three or more layers including other layers, as long as the film has the resin layer A and the resin layer B.

First, examples of the method for forming the resin layer B include a method in which a raw material for the resin layer B is supplied to an extruder, melt-extruded from a slit-shaped spinneret such as a T-die, then solidified on a cooling drum or the like to provide the resin layer B, a method in which a raw material for the resin layer B in a solution or a liquid form is applied by coating with a coater onto a film for solution deposition substrates, such as a polyolefin film, a polyethylene terephthalate film, a polyimide film, or the films with releasability enhanced by silicone coating, then dried or subjected to polymerization, and solidified to form the resin layer B, and a method in which the liquid is cast on a casting belt, then dried or subjected to polymerization, and solidified to form the resin layer B. Above all, from the viewpoint of enhancing the thickness uniformity of the resin layer B, it is preferable to employ either a method of forming the resin layer B by a method in which a raw material for the resin layer B in a solution or a liquid form is applied by coating with a coater onto a film for solution deposition substrates, and then dried, or a method in which a raw material is supplied to an extruder, melt-extruded from a slit-shaped spinneret such as a T-die, and solidified on a cooling drum or the like to mold the raw material into a film shape, and then uniaxially or biaxially stretched to provide the resin layer B. When the resin layer B is formed on the film for solution deposition substrates, the resin layer B may be optionally peeled off from the film for solution deposition substrates before the formation of the resin layer A, and from the viewpoint of enhancing the transportability, it is preferable to form the resin layer A without peeling.

As an example of the method for forming the resin layer B, a method in the case of providing a biaxially oriented PPS layer as the resin layer B will be described. As a raw material, a PPS vacuum-dried at 170° C. to 190° C. is supplied to an extruder, melted at a temperature of 310° C. to 330° C. under a nitrogen atmosphere, and introduced into a T-die spinneret. Next, the PPS is extruded from the inside of the T-die spinneret into a sheet shape as a molten monolayer sheet, and the molten monolayer sheet is discharged onto a cast drum maintained at a surface temperature of 10° C. to 30° C., and then brought into close contact with the cast drum by an electrostatic application method, and then cooled and solidified for casting to obtain an unstretched film. The obtained unstretched film is stretched at a ratio of 2.0 times to 5.0 times in the longitudinal direction of the film at a stretching temperature of 85° C. to 115° C. with the use of a longitudinal stretching machine including multiple groups of rolls heated and through the use of the difference between the circumferential speeds of the rolls. Thereafter, while both ends of the obtained uniaxially stretched film in the width direction are held by clips, the film is guided to a tenter, and stretched at a ratio of 2.5 to 5.0 times in the width direction at a stretching temperature of 95° C. to 105° C. Subsequently, the film is subjected to a heat treatment at 270° C. to 290° C., and to a relaxation treatment of 1% to 10%, and cooled to room temperature. Then, the film surface (on the side in contact with the surface of cast drum) is subjected to a corona discharge treatment in the atmosphere at a treatment intensity of 20 $W \cdot min/m^2$ to 30 $W \cdot min/m^2$, and thereafter, a biaxially oriented PPS film of 1 μm to 8 μm in thickness can be obtained by removing the film edge, and used as the resin layer B.

Examples of the method for forming the resin layer A on one surface of the resin layer B include a method in which a raw material for the resin layer A in a solution or a liquid form is applied by coating with a coater onto the resin layer B, and then dried, and a method in which a raw material for the resin layer A is vacuum-deposited on the resin layer B. In the case of forming the resin layer A by coating one surface of the resin layer B with a raw material for the resin layer A, the coated surface of the film to serve as the resin layer B may be subjected to a surface treatment such as a corona discharge treatment in advance. Performing a surface treatment such as a corona discharge treatment improves the wettability of the coating composition for forming the resin layer A with the coated surface. As a result, the coating composition has repellency reduced, thereby facilitating the achievement of a uniform coating thickness.

For forming the resin layer A, it is preferable to crosslink the component of the coating composition for forming the resin layer A. The method for crosslinking is not to be considered particularly limited, and examples thereof include a method of developing a crosslinking reaction by heat or ultraviolet rays with the use of a composition with multiple reactive sites as the coating composition for forming the resin layer A, and a method in which the coating composition for forming the resin layer A is applied by coating, and then crosslinked by electron beams. Examples of the composition with multiple reactive sites include an acrylate or urethane acrylate having two or more vinyl groups, an epoxy having two or more epoxy groups, a condensate of a melamine and a formaldehyde, a mixture of a compound having two or more isocyanate groups and a compound having three or more hydroxy groups, and a mixture of a compound having two or more isocyanate groups and a compound having three or more amino groups. Among these examples, it is preferable to use the acrylate or urethane acrylate having two or more vinyl groups, the mixture of a compound having two or more isocyanate groups and a compound having three or more hydroxy groups, or the mixture of a compound having two or more isocyanate groups and a compound having three or more amino groups, from the viewpoint of promoting the decomposition of the resin layer A at the time of dielectric breakdown and enhancing the self-healing performance.

For promoting the crosslinking reaction, a catalyst such as an acid or a base, or an additive such as a cation initiator, an anion initiator, or a radical initiator may be added in accordance with the reactivity of the reactive sites in forming the resin layer A. For example, in the case of using an acrylate having two or more vinyl groups as the coating composition for forming the resin layer A, the crosslinking reaction can be promoted by preparing a coating liquid with the addition of a radical initiator that generates radicals by ultraviolet rays to the coating liquid, coating the resin layer B with the coating liquid, and then irradiating the coating liquid with ultraviolet rays. The radical initiator is not to be considered particularly limited, and a hydroxyalkylphenone-type initiator, an aminoacetophenone-type initiator, or the like that generates radicals by ultraviolet rays can be used. By forming the crosslinked structure in the resin layer A as described above, the heat resistance of the film for film capacitors according to embodiments of the present invention can be easily enhanced.

As an example, a method of forming the resin layer A with a bar coater will be described. A coating liquid is prepared by mixing 100 parts by mass of acrylate, 1 part by mass to 5 parts by mass of α-hydroxyalkylphenone, and 800 parts by mass to 1000 parts by mass of 2-butanone. The prepared coating liquid is applied by coating with a bar coater to the surface of the resin layer B formed by the method mentioned above, subjected to the corona discharge treatment, such that the coating film thickness after curing is 50 nm to 500 nm. This layer is introduced into a drying furnace at 80° C. to 100° C., and dried such that the drying time is 30 seconds to 2 minutes. Subsequently, the coating film is introduced into a UV irradiator and subjected to curing under the conditions of illuminance: 40 $mW/cm^2$ to 70 $mW/cm^2$, irradiation dose: 0.1 $J/cm^2$ to 0.3 $J/cm^2$, and oxygen concentration: 100 ppm to 300 ppm, whereby the resin layer A can be formed. In addition, the obtained laminate of the resin layer A and resin layer B can be wound up to obtain the film for film capacitors according to embodiments of the present invention.

On the thus-obtained film for film capacitors, including the resin layer A and the resin layer B, a metal such as aluminum or an alloy of aluminum and zinc can be laminated by a vacuum deposition method, a sputtering method, an ion plating method, a plating method, or the like to obtain the metal laminate according to embodiments of the present invention.

EXAMPLES

Hereinafter, the film for film capacitors according to embodiments of the present invention will be specifically described with reference to examples. Here are methods for measuring characteristic values and methods for evaluating effects.

(1) Film Thickness

The thickness of the film was measured at any ten points under an atmosphere at 23° C. and 65% RH with the use of a contact-type electronic micrometer (K-312A type) manufactured by ANRITSU CORPORATION. The arithmetic mean value of the thicknesses at the ten points was regarded as a film thickness of the film.

(2) Thickness of Resin Layer A and Thickness of Resin Layer B

With the use of a microtome method, an ultrathin section of 5 mm in width with a cross section in the width direction-thickness direction of the film was prepared, and the cross section was coated with platinum to provide an observation sample. Next, with the use of a field emission scanning electron microscope (S-4800) manufactured by Hitachi, Ltd., the cross section of the film was observed at an acceleration voltage of 1.0 kV, and the thickness of resin layer A and the thickness of the resin layer B were measured from any site of the observed image. Further, of the two layers, the thicker layer was a resin layer B, whereas the thinner layer was a resin layer A, and the observation magnification was set to 10,000 times. Furthermore, the same measurement was performed 20 times in total, and the average values thereof were regarded respectively as the thickness of the resin layer A and the thickness of the resin layer B.

(3) Melting Point of Film

In accordance with JIS K-7122 (1987), 3.0 mg of the film was weighed, and with the use of a differential scanning calorimeter (EXSTAR DSC 6220 manufactured by Seiko Instruments Inc.), the resin was heated at a heating rate of 20° C./min from 25° C. to Tmax [° C.] at a heating rate of 20° C./min to obtain a differential scanning calorimetry chart. From the obtained differential scanning calorimetry chart, the melting peak temperatures were determined, based on the method described in JIS K-7121 (1987). Among the obtained melting peak temperatures, the highest melting peak temperature was defined as the melting point of the film. Tmax [° C.] was initially set to 350° C. for measurement, and when no melting point was observed, set to 380° C. for measurement again. When no melting point was observed at Tmax=380° C., no melting point was determined.

(4) Glass Transition Temperature of Film

In accordance with JIS K-7122 (1987), 3.0 mg of the film was weighed, and among intermediate glass transition temperatures determined, based on the method described in JIS K-7121 (1987), in a differential scanning calorimetry chart of 2nd RUN obtained by heating at a heating rate of 20° C./min the resin at a heating rate of 20° C./min from 25° C. to Tmax [° C.] (1st Run), holding the state for 5 minutes, then rapidly cooling to reach 25° C. or lower, and again heating at a heating rate of 20° C./min from 25° C. to Tmax [° C.] (2nd Run) with the use of a differential scanning calorimeter (EXSTAR DSC 6220 manufactured by Seiko Instruments Inc.), the highest intermediate glass transition temperature was defined as the glass transition temperature of the film. Tmax [° C.] was initially set to 350° C. for measurement, and when no glass transition temperature was observed, set to 380° C. for measurement again. When no glass transition temperature was observed at Tmax=380° C., no glass transition temperature was determined.

(5) Atomic Fractions of Hydrogen Atom H, Carbon Atom C, Sulfur Atom S, Silicon Atom Si, Nitrogen Atom N, and Oxygen Atom O Contained in Resin Layer A, and Content of Oxygen Atom O and Silicon Atom Si in Layer B The surface of the film on the side with the resin layer A was analyzed by Rutherford backscattering/hydrogen forward scattering simultaneous spectrometry (Pelletron 3SDH manufactured by National Electrostatics Corporation) to obtain the atom yields Y(H), Y(C), Y(S), Y(Si), Y(N), and Y(O) of the hydrogen atom H, carbon atom C, sulfur atom S, silicon atom Si, nitrogen atom N, and oxygen atom O of the resin layer A. From the obtained values, the values obtained based on the following formulas were defined as the atomic fractions of the hydrogen atoms H, carbon atoms C, sulfur atoms S, silicon atoms Si, nitrogen atoms N, and oxygen atoms O contained in the resin layer A.

< Calculation formulas >

$$\text{With } Y(\text{All}) = Y(\text{C}) + Y(\text{S}) + Y(\text{Si}) + Y(\text{N}) + Y(\text{O}) + Y(\text{H}),$$

$$\text{Atomic fraction of hydrogen atom H} = Y(\text{H})/Y(\text{All});$$

$$\text{Atomic fraction of carbon atom C} = Y(\text{C})/Y(\text{All});$$

$$\text{Atomic fraction of sulfur atom S} = Y(\text{S})/Y(\text{All});$$

$$\text{Atomic fraction of silicon atoms Si} = Y(\text{Si})/Y(\text{All});$$

$$\text{Atomic fraction of nitrogen atom N} = Y(\text{N})/Y(\text{All}); \text{ and}$$

$$\text{Atomic fraction of oxygen atoms O} = Y(\text{O})/Y(\text{All}).$$

Further, the measurement conditions are as follows.
Incident ions: $^{4}He^{++}$
Incident energy: 2300 keV
Incident angle: 75 deg
Scattering angle: 160 deg
Recoil angle: 30 deg
Sample current: 4 nA
Beam diameter: 2 mmφ
In-plane rotation: no
Irradiation dose: 0.5 μC×20 points.

(6) XA

XA was calculated by the following formula (i) with the use of each of the values obtained by the method described in the section (5).

$$XA = \text{(atomic fraction for carbon atom C + atomic fraction for nitrogen atom N + atomic fraction for sulfur atom S + atomic fraction for silicon atom Si)} / \text{(atomic fraction for hydrogen H + atomic fraction for oxygen atom O)} \quad \text{Formula (i)}$$

(7) Pyrolysis GC-MS

50 μg of the film was weighed, and analyzed with a pyrolysis GC-MS apparatus configured and set as follows to obtain a GC chart. The intensity average of the signals at positions at the retention time of 5.0 s (10-th scan), retention time of 15.0 s (30-th scan), and retention time of 25.0 s (50-th scan) in the obtained chart was defined as the baseline intensity. Differences in baseline intensity were taken from the intensity at each point of the GC chart to create a GC chart subjected to the baseline correction. Referring to a region of the GC chart subjected to the baseline correction with the retention time of 2 minutes to 20 minutes, the intensity of the peak with the highest intensity (maximum peak intensity) was recorded among the peaks with the intensity of $5.0\times10^{3}$ or more. It is to be noted that when no peak with the intensity of $5.0\times10^{3}$ or more was observed, the same measurement was performed 3 times, and the average intensity value of the maximum peaks obtained was regarded as the measured value of the film.

<Pyrolyzer>
Apparatus name: PY-3030D (manufactured by Frontier lab)
Pyrolyzer Temp: 400° C.

<GC>
Apparatus name: 7890A (manufactured by Agilent)
Column: "Ultra ALLOY" (registered trademark) 5 (MS/HT) 30 m×0.25 mm id×0.25 μm 5% Diphenyl-95% dimethylpolysiloxane
Column Temp.: 40° C. (3 min)-320° C. (18 min) (Rate 20° C./min)
Injection Temp.: 300° C.
Injection Mode: Split (50:1) 1.5 mL/min const. F <MS>
Apparatus name: JMS-Q1050GC (JEOL)
Ionization Mode: EI+
Scan Range: m/z 10.000 to 800.000
Scan Rate: 0.5 s/scan.

(8) Thermogravimetric Weight Analysis

In the case of measuring the rate of change in thermogravimetric weight of the film, 10 mg of the film was weighed for use as a sample, and in the case of measuring the rate of change in thermogravimetric weight of the resin layer A, 10 mg of the resin layer A was weighed from the film including the resin layer A for use as a sample. The samples were stored in an environment at 23° C. and 50% RH for 24 hours. Subsequently, the stored sample was heated from 23° C. to 500° C. at a heating rate of 10° C./min under a nitrogen atmosphere in a thermogravimetric analyzer TGA-50 (manufactured by Shimadzu Corporation) to measure a change in thermogravimetric weight. From the obtained change in thermogravimetric weight, the thermogravimetric weight change rate at each temperature was determined with the thermogravimetric weight at 170° C. as 100% by mass, and the temperature at which the thermogravimetric weight was 99% by mass was regarded as the 1% by mass decrease temperature, and the temperature at which the thermogravimetric weight was 90% by mass was regarded as the 10% by mass decrease temperature. With the foregoing measurement as one set, n=5 sets of measurement were performed, and the average values of the 1% by mass decrease temperature and 10% by mass decrease temperature in the n=5 sets were defined respectively as the 1% by mass decrease temperature and 10% by mass decrease temperature of the sample.

(9) Arithmetic Mean Roughness Sa

The arithmetic mean roughness Sa was measured and calculated in accordance with ISO 25178-2:2012 and 25178-3:2012. The measurement was, however, performed with the use of a scanning white interference microscope "VS1540" (manufactured by Hitachi High-Tech Science Corporation, the measurement conditions and device configuration as described below), the imaging screen complemented (completely complemented) with attached analysis software, was subjected to a surface correction by polynomial fourth order approximation, and then processed with a median filter (3×3 pixels) was subjected to the measurement. In addition, the S-filter Nesting Index of the S-filter was set to 0.455. Both surfaces of the film cut into a square shape of 5 cm×5 cm were subjected to the measurement, the intersection of the diagonals was defined as the first measurement point (start point), while the positions of 1 cm away from the start point toward each of the four corners were defined as the second to fifth measurement points, thereby determining the five measurement positions in total, the measurement was performed at each of the measurement positions, Sa at each measurement position was determined in accordance with the procedure mentioned above, and the average value thereof was employed as Sa of the film. For the film including the resin layer A on one surface of the resin layer B, the outermost layer surface of the resin layer A with respect to the resin layer B was defined as an α surface, whereas the back surface was defined as a β surface, and for the film including no resin layer A, the surface with lower Sa was defined as an α surface, whereas the back surface was defined as a β surface. When each of the surfaces has the same Sa, one of the surfaces is defined as an α surface, whereas the other surface is defined as a β surface.

<Measurement Conditions and Device Configuration>

Objective lens: 10×
Lens barrel: 1×
Zoom lens: 1×
Wavelength filter: 530 nm white
Measurement mode: Wave
Measurement software: VS-Measure 10.0.4.0
Analysis software: VS-Viewer 10.0.3.0
Measurement area: 561.1 μm×561.5 μm
Number of pixels: 1,024×1,024.

(10) Self-Healing (SH) Defect Ratio and Self-Healing Performance

The α surface of the film was subjected to a corona discharge treatment in the atmosphere at a treatment intensity of 25 W·min/m$^2$. Then, on the surface subjected to the corona discharge treatment, aluminum was deposited at an atmospheric pressure of $1.0\times10^{-3}$ Pa and a filament voltage of 2.6 kV in a bell-jar vacuum deposition apparatus to form a deposited film of 50 nm, thereby obtaining a metal layer-laminated film. The metal layer-laminated film obtained was cut into a rectangular shape of 12 cm×7.5 cm with a long side in the longitudinal direction to provide a test piece. Then, a "Teflon" (registered trademark) sheet of 1 mm in thickness and of 10 cm in square size was placed on a copper plate of 1 m×2 m, and the test piece was placed such that the short side of the test piece was parallel to one side of the "Teflon" (registered trademark) sheet, and such that a region of 1 cm from one of the short sides of the test piece to the end was placed on the "Teflon" (registered trademark) sheet. Thereafter, a plate-shaped conductive rubber electrode of 5 cm in square size was placed on the "Teflon" (registered trademark) sheet in such a manner as to sandwich a part of the test piece placed on the "Teflon" (registered trademark) sheet on the order of 2 cm$^2$. Furthermore, a cylindrical electrode of 3 cmφ was placed on the rubber electrode such that the center of gravity was located above the region where the rubber electrode, the test piece, and the "Teflon" (registered trademark) sheet were overlapped with each other. Multiple dielectric breakdown marks were generated in the metal layer-laminated film by performing a so-called step-up test in which a DC power supply was connected to each of the cylindrical electrode and copper plate via an electric wire, a voltage of 100 VDC was applied as an initial voltage, and after a lapse of 15 seconds at the voltage, the applied voltage was repeatedly gradually increased up to the initial voltage +800 VDC at 100 VDC/30 seconds in a stepwise manner. The generated dielectric breakdown marks were visually observed to determine the number of the dielectric breakdown marks each with two or more dielectric breakdown marks overlapped, determined as one SH defective site, and the number of the other dielectric breakdown marks, each determined as one normal site, and the SH defect rate was determined by the following formula. The same measurement was performed two times, and the average value was employed as the SH defect ratio of the film. It is to be noted that when no dielectric breakdown was generated, the same measurement was performed with the initial voltage set to 900 VDC. When no dielectric breakdown was generated at 900 VDC, the same measurement was repeated with the initial voltage set to +800 VDC until generating dielectric breakdown, and when no dielectric breakdown was generated even at the initial voltage of 10,000 VDC, the SH defect ratio was regarded as 0%. Based on the SH defect ratio of the film, self-healing performance was evaluated in accordance with the following evaluation criteria.

< Calculation formulas >

$$SH\text{ defect ratio (\%)} = 100\times(\text{number of } SH \text{ defective sites})/(\text{number of normal sites} + \text{number of } SH \text{ defective sites})$$

<Evaluation Criteria>

S: The SH defect ratio was 10% or less.
A: The SH defect ratio was more than 10% and 20% or less.
B: The SH defect ratio was more than 20% and 35% or less.
C: The SH defect ratio was more than 35% and 50% or less.
D: The SH defect ratio is more than 50%.

(11) Evaluation of Processability

The α surface of the film was subjected to a corona discharge treatment in the atmosphere at a treatment intensity of 25 W·min/m$^2$. Then, on the surface subjected to the corona discharge treatment, commercially available aluminum was deposited at an atmospheric pressure of $1.0\times10^{-3}$ Pa and a filament voltage of 2.6 kV in a bell-jar vacuum deposition apparatus to form a deposited film of 50 nm, thereby obtaining a metal layer-laminate. The metal layer-laminate obtained was cut into a rectangular shape of 12 cm×7.5 cm with a long side in the longitudinal direction to provide a test piece. With the use of a slip tester manufactured by TOYO SEKI CO., LTD., in accordance with JIS K 7125 (1999), the dynamic friction coefficient between the surface of the obtained metal layer-laminate with the metal deposited and the surface thereof without any metal deposited was measured three times with a load of 200 g at 25° C. and 65% RH, and the average value of the obtained values was defined as the dynamic friction coefficient μM of the metal laminate. It is to be noted that when the frictional force detected by the load cell at the time of the measurement exceeded 5.9 N, the measurement was interrupted, and the measured value of μM in that case was regarded as >3.0. Based on the obtained μM, the processability of the film was determined in accordance with the following criteria.

A: μM being 0.60 or less
B: μM being more than 0.60 and 0.85 or less
C: μM being more than 0.85 and 1.5 or less
D: μM being more than 1.5.

(12) Dielectric Loss Tangent

The dielectric loss tangent was measured in accordance with JIS C 2138-2007. First, the film was cut into a square shape of 50 mm×50 mm, and a conductive paste was applied to one surface of the square shape to have Φ18 mm and to the other surface thereof to have Φ28 mm, thereby forming electrodes. After the sample with the electrodes formed was stored at 22° C. for 90 hours under an environment of 60% RH, the dielectric loss tangent was measured at n=5 at 22° C., 60% RH and a frequency of 10 kHz with a precision LCR meter HP-4284A (manufactured by Agilent Technologies), and the average value of the obtained values was defined as the dielectric loss tangent of the film.

(13) Evaluation of Film Dielectric Breakdown Voltage at 150° C.

After the film was heated for 1 minute in an oven kept at 150° C., the dielectric breakdown voltage was measured in the atmosphere in accordance with JIS C2330 (2001) 7.4.1.11.2 B method (plate electrode method). The dielectric breakdown voltage test (the measurement mentioned above) was performed 30 times, the obtained values were each divided by the thickness (measured in the section (1) mentioned above) of the film, and converted into the unit of (V/μm), then from the obtained measured values (calculated values) of the 30 points in total, the 5 points and the 5 points were excluded respectively in descending order from the maximum value in ascending order from the minimum value, and the average value of the other 20 points was obtained, and defined as the film dielectric breakdown voltage at 150° C. From the obtained film dielectric breakdown voltage at 150° C., the film dielectric breakdown voltage at 150° C. was evaluated as follows.

S: The film dielectric breakdown voltage at 150° C. was 270 V/μm or more.

A: The film dielectric breakdown voltage at 150° C. was 240 V/μm or more and less than 270 V/μm.

B: The film dielectric breakdown voltage at 150° C. was 210 V/μm or more and less than 240 V/μm.

C: The film dielectric breakdown voltage at 150° C. was 100 V/μm or more and less than 210 V/μm.

D: The film breakdown voltage at 150° C. was less than 100 V/μm, or the shrinkage of the film was too large to be evaluated.

(14) Evaluation of Film Capacitor Characteristics (Reliability at 150° C.)

The α surface of the film was subjected to a corona discharge treatment in the atmosphere at a treatment intensity of 25 W·min/m$^2$. Then, on the surface subjected to the corona discharge treatment, aluminum was deposited in a deposition pattern with a so-called T-shaped margin (a pitch (period) of 17 mm in the longitudinal direction and a fuse width of 0.5 mm with a masking oil) provided with a margin part in a direction perpendicular to the longitudinal direction with a film resistance of 10 Ω/sq (with the use of a vacuum deposition machine manufactured by ULVAC, Inc. for the deposition). Thereafter, the obtained vapor deposition body was slit to obtain a vapor deposition reel of 50 mm in film width (2 mm in end margin width). Then, with the use of this reel, film capacitor elements were wound up with an element winding machine (KAW-4NHB) manufactured by KAIDO MANUFACTURING CO., LTD., subjected to metal spraying, and then subjected to a heat treatment at a temperature of 130° C. for 8 hours under reduced pressure, and lead wires were attached to finish film capacitor elements. With the use of the thus obtained ten capacitor elements, a so-called step-up test was performed in which a voltage of 250 VDC was applied to the capacitor elements under a high temperature of 150° C., and after a lapse of 10 minutes at the voltage, the applied voltage was repeatedly gradually increased at 50 VDC/1 minute in a stepwise manner. After increasing the voltage until the electrostatic capacitance was decreased down to 12% or less with respect to the initial value, the capacitor elements were disassembled to examine the states of breakdown, and the film capacitor characteristics were evaluated in accordance with the following evaluation criteria.

<Evaluation Criteria>

S: Without any change in the shape of the film capacitor element, no penetrating breakdown was observed.

A: Without any change in the shape of the film capacitor element, penetrating breakdown was observed through five film layers or less.

B: Without any change in the shape of the film capacitor element, penetrating breakdown was observed through six to seven film layers.

C: There was a change recognized in the shape of the film capacitor element. Alternatively, penetrating breakdown was observed through eight to fourteen film layers.

D: The shape of the film capacitor element was greatly changed and broken, or with the poor processability of the film, a film capacitor element failed to be prepared.

The evaluation results mean that the film capacitor characteristics are excellent in the order of S to D, S to C were regarded as acceptable, and D was regarded as unacceptable because it is substantially difficult to use the film as a film for capacitors.

[Raw Materials, Films]

Acrylate 1: Product name "epoxy ester 3000A", bisphenol A diglycidyl ether acrylic acid adduct, manufactured by Kyoeisha Chemical Co., Ltd.

Acrylate 2: Product name "Viscoat" (registered trademark) #300, condensate of pentaerythritol and acrylic acid, containing 45% by mass of pentaerythritol tetraacrylate and 35% by mass of pentaerythritol triacrylate, manufactured by OSAKA ORGANIC CHEMICAL INDUSTRY LTD.

Acrylate 3: Product name "TPGDA", tripropylene glycol diacrylate, manufactured by DAICEL-ALLNEX LTD.

Urethane acrylate 1: Product name "UV-3500BA", diluted product of urethane acrylate with butyl acetate, manufactured by Mitsubishi Chemical Corporation Polyurea compound 1: Into a 500 mL eggplant flask, 5.90 parts by weight of dicyclohexylmethane 4,4'-diisocyanate, 5.0 parts by weight of isophorone diisocyanate, 2.6 parts by weight of hydroxyethylacrylamide, 0.012 parts by weight of dioctyltin dilaurate as a catalyst, and 9.0 parts by weight of acryloylmorpholine as a diluent monomer were prepared, and stirred at room temperature for 1.5 hours. To the stirred reaction solution, 0.71 parts by weight of monoethanolamine was delivered by drops, and the solution was further stirred at room temperature for 3 hours. Then, to the stirred reaction solution, a mixed solution of 12 parts by weight of isopropanol and 3.8 parts by weight of dicyclohexylmethane-4,4'-diamine was added, and the solution was further stirred at room temperature for 3 hours to obtain a polyurea compound 1 having a radically polymerizable substituent [non-volatile content: 70%, weight average molecular weight (Mw)=1300].

2-butanone: Manufactured by FUJIFILM Wako Pure Chemical Corporation

"Omnirad" (registered trademark) 184: 1-hydroxycyclohexyl phenyl ketone manufactured by IGM Resins B.V.

Polyphenylene sulfide-based resin granule 1 (PPS granule 1):

Into a 1 liter autoclave with a process stirrer, 100 mol of 48% by mass sodium hydrosulfide, 1.02 mol of 95% by mass sodium hydroxide, 1.54 mol of N-methyl-2-pyrrolidone (NMP), 0.47 mol of sodium acetate, and 140 g of ion-exchanged water were prepared, and gradually heated to 228° C. over about 3 hours while stirring at 250 rpm and passing nitrogen at normal pressure, and after distilling off 212 g of water and 4 g of NMP, the reaction vessel was then cooled to 160° C. Next, 1.00 mol of p-dichlorobenzene (p-DCB) and 1.32 mol of NMP were added, and the reaction vessel was sealed under nitrogen gas. Thereafter, while stirring at 250 rpm, the temperature was raised from 200° C. to 235° C. at a rate of 0.7° C./min, and after reaching 235° C., the reaction was continued at 235° C. for 95 minutes. Thereafter, the temperature was raised to 270° C. at a rate of 0.8° C./min, and held for 100 minutes. After reaching 270° C., 1 mol of water was injected into the system over 15 minutes. The autoclave was held at 270° C. for 100 minutes, then cooled down to 200° C. at a rate of 1.0° C./min, and thereafter, cooled nearly to room temperature by pouring cooling water at room temperature over the autoclave. Subsequently, the contents were taken out, and diluted with 0.4 liters of NMP, and then stirred at 85° C. for 30 minutes, and the solvent and the solid were then filtered off through a sieve (80 mesh). Further, 0.5 liters of NMP was added to the obtained solid, and the mixture was then stirred at 85° C. for 30 minutes to filter off the solid. Thereafter, the obtained solid was washed three times with 0.9 liters of warm water, and then filtered off. To the thus obtained particles (solid), 1 liter of warm water was added to wash the particles two times, and the particles were filtered off to obtain polymer particles. These particles were subjected to hot-air drying at 80° C., and then dried under reduced pressure at 120° C. to obtain granules (PPS granules 1) of a polyphenylene sulfide (PPS) resin with a melting point of 280° C. and a weight average molecular weight of 70,000.

PPS Raw Material 1 for Film (PPS1):

A mixed powder obtained by mixing 100 parts by mass of the PPS granules 1, 0.05 parts by mass of calcium carbonate particles 1 of 0.7 μm in average particle diameter ("NITOREX" #30PS manufactured by Nitto Funka Kogyo K.K.), and 0.2 parts by mass of calcium stearate was pelletized to prepare a resin pellet containing PPS as a main component. The obtained resin pellet was put into a vented co-rotating twin-screw kneading extruder (manufactured by The Japan Steel Works, Ltd., screw diameter: 30 mm, screw length/screw diameter=45.5) heated to 320° C., melt-extruded at a residence time of 90 seconds and a screw rotation speed of 150 rpm to be discharged into a strand shape, and cooled with water at a temperature of 25° C. Thereafter, the strand shape was immediately cut to prepare chips as a PPS raw material 1 for film (PPS1).

PPS Raw Material 2 for Film (PPS2):

In the same manner as the PPS1 except for adding no calcium carbonate particles 1, chips were prepared as a PPS raw material 2 for film (PPS2).

PPS Raw Material 3 for Film (PPS3):

In the same manner as in PPS 1 except for using calcium carbonate particles 2 ("NITOREX" #30PS manufactured by Nitto Funka Kogyo K.K.) of 1.2 μm in average particle size in place of the calcium carbonate particles 1, chips were prepared as a PPS raw material 3 for film (PPS3).

PPS Film 1:

As a raw material, the PPS1 was vacuum-dried at 180° C. for 3 hours. Then, the PPS1 was supplied to an extruder, melted at a temperature of 320° C. under a nitrogen atmosphere, and introduced into a T-die spinneret. Then, the PPS1 was extruded from the inside of a T-die spinneret into a sheet shape as a molten monolayer sheet, and the molten monolayer sheet was discharged onto a cast drum with a rotation speed of 4.0 m/min, maintained at a surface temperature of 25° C., brought into close contact with the cast drum by an electrostatic application method, and then cooled and solidified for casting to obtain an unstretched film. The obtained unstretched film was stretched at a ratio of 3.2 times in the longitudinal direction of the film at a stretching temperature of 103° C. with the use of a longitudinal stretching machine including multiple groups of rolls heated and through the use of the difference between the circumferential speeds of the rolls. Thereafter, while both ends of the obtained uniaxially stretched film in the width direction are held by clips, the film was guided to a tenter, and stretched at a ratio of 3.3 times in the width direction at a stretching temperature of 100° C. Subsequently, the film is subjected to a heat treatment at 280° C., and to a relaxation treatment of 2%, and cooled to room temperature. Then, the film surface (on the side in contact with the surface of cast drum) is subjected to a corona discharge treatment in the atmosphere at a treatment intensity of 25 W·min/$m^2$, and thereafter, a biaxially stretched PPS film of 4.3 μm in thickness was obtained by removing the film edge.

PPS Film 2:

In the same manner as the PPS film 1 except for using the PPS2 as a raw material, and for the stretch ratio of 3.4 times in the longitudinal stretching machine, a biaxially stretched PPS film was obtained.

PPS Film 3:

In the same manner as the PPS film 1 except for using the PPS3 as a raw material, and for the stretch ratio of 3.0 times in the longitudinal stretching machine, a biaxially stretched PPS film was obtained.

PPS Film 4:

A polyethylene terephthalate (PET) containing 0.5 mass % by mass of spherical silica of 500 μm in diameter with an intrinsic viscosity of 0.6 and a polyphenylene sulfide with a melt viscosity of 4000 poise under 300° C. and a shear rate of 200 $s^{-1}$ were supplied to separate extruders, guided in a molten state with a lamination device at the upper part of a spinneret so as to provide a two-layer laminate of polyethylene terephthalate/polyphenylene sulfide, discharged from the continuously provided T-die spinneret, and rapidly cooled with a cooling rotating drum to obtain a two-layer laminated sheet of polyethylene terephthalate/polyphenylene sulfide. Then, the two-layer laminated sheet was allowed to travel on a plurality of heating rolls with a surface temperature of 90° C., and stretched to 3.7 times in the longitudinal direction between the heating rolls and a cooling roll at 30° C., which was provided next to the group of heating rolls and different therefrom in circumferential speed. The obtained uniaxially stretched sheet was stretched to 3.5 times in the width direction at 100° C. with the use of a tenter, and subsequently heat-treated at 260° C. for 10 seconds to obtain a biaxially stretched film of 4 μm in total thickness with a polyethylene terephthalate layer thickness of 0.1 μm.

PP Film 1:

A linear polypropylene (PP) with a meso-pentad fraction of 0.98, a melting point of 167° C., and a melt flow rate (MFR) of 2.6 g/10 min, subjected to polymerization with a Ziegler-Natta catalyst, was supplied to a single-screw melt extruder, and melt-extruded at 240° C., and thereafter, the molten polymer was, with foreign matters removed therefrom by a sintered filter with a cut of 80 μm, discharged into a sheet shape from a T-die. The molten sheet-shaped product was brought into close contact with a casting drum maintained at 95° C. by electrostatic application, and cooled and solidified to obtain an unstretched sheet. Then, this unstretched sheet was gradually preheated up to 145° C. with a plurality of roll groups, passed between the rolls continuously kept at a temperature of 145° C. with a difference in circumferential speed, and stretched to 5.0 times in the longitudinal direction. Subsequently, the obtained uniaxially stretched film was guided to a tenter, stretched to 8 times in the width direction at a temperature of 165° C., then heat-treated at 130° C. while being relaxed by 8% in the width direction as the first-stage heat treatment and the relaxation treatment, and further heat-treated at 140° C. with the film held in the width direction with clips as the second-stage heat treatment. Thereafter, the film was subjected to a cooling step at 100° C. and then guided to the outside of the tenter, the clips at the film ends were released, and the film of 3.0 μm in thickness was wound up to obtain a biaxially stretched PP film.

PEI Film 1:

With a polyetherimide [product name: ULTEM 1010-1000-NB (hereinafter, abbreviated as "1010-1000") manufactured by SABIC Innovative Plastics] prepared, this molding material was allowed to stand for 12 hours in a dehumidified hot air dryer [product name: Multi JET MJ3, manufactured by MATSUI MFG. CO., LTD.] heated to 150° C. to dry the molding material, after confirming that the water content of the molding material was 300 ppm or less, the molding material was set in a single-screw extruder of φ40 mm equipped with a T-die of 900 mm in width, and then melt-kneaded, the melt-kneaded molding material was continuously extruded from the T-die of the single-screw extruder to extrude and mold the polyetherimide into a band shape, and the extruded and molded polyetherimide was cooled and solidified on a mirror surface roll, and wound up to obtain a PEI film 1 of 6.5 μm in thickness.

PES Film 1:

Into a raw material input port of a co-rotating twin-screw extruder, 100 parts by mass of polyethersulfone resin [SUMIKAEXCEL 4800P manufactured by SUMITOMO CHEMICAL COMPANY, LIMITED] with a glass transition point of 225° C. was put, and then melted, calcium carbonate particles 1 were supplied to a side feeder on the die side of the co-rotating twin-screw extruder so as to be 5.0 parts by mass with respect to 100 parts by mass of the polyethersulfone resin, and then melt-kneaded and dispersed, and the melt-kneaded product was extruded into a bar shape from a die at a distal end of the co-rotating twin-screw extruder, then cooled with water, and cut with a pelletizer to prepare a pellet-shaped molding material. In the same manner as the PEI film 1 except for using this molding material in place of the polyetherimide, a PES film 1 was obtained.

Example 1

In accordance with the coating liquid formulation in Table 1, the urethane acrylate 1, the 2-butanone, and the "Omnirad" (registered trademark) 184 were mixed at 100:900:0.3 (ratio by mass) to prepare a coating liquid in an amount of 100 g. As shown in Table 1, with the PPS film 1 as a substrate film (resin layer B), the surface of the PPS film, subjected to a corona treatment, was coated uniformly with the coating liquid with the use of a bar coater such that the thickness after curing was the thickness (50 nm) of the resin layer A as shown in Table 1, and then dried in a drying furnace at 90° C. for 1 minute. Subsequently, the coated film was introduced into a UV irradiator, the coating film was subjected to curing under conditions of illuminance: 50 mW/cm$^2$, irradiation dose: 0.1 J/cm$^2$, and oxygen concentration: 100 ppm to form the resin layer A, and then, the laminate of the resin layer A and the resin layer B was wound up to obtain a film for film capacitors. The evaluation results are shown in Table 1.

Examples 2 to 10

In the same manner as in Example 1 except for the coating liquid formulation, the substrate film, and the thickness of the resin layer A as shown in Table 1, a film for film capacitors was obtained. The evaluation results are shown in Table 1.

Comparative Example 1

The PPS film 1 was used as a film for film capacitors. The evaluation results are shown in Table 2.

Comparative Example 2

The PPS film 4 was used as a film for film capacitors. The evaluation results are shown in Table 2.

Comparative Example 3

The PP film 1 was evaluated as a film for film capacitors. The evaluation results are shown in Table 2.

Comparative Example 4

The PEI film 1 was evaluated as a film for film capacitors. The evaluation results are shown in Table 2.

Comparative Example 5

In the same manner as in Example 1 except for the same coating liquid formulation as in Example 5, the resin layer A of 550 nm in thickness, and the PEI film 1 for the substrate film, a film for film capacitors was obtained. The evaluation results are shown in Table 2.

TABLE 1-1

| | | | | Example 1 | Example 2 | Example 3 | Example 4 | Example 5 |
|---|---|---|---|---|---|---|---|---|
| Resin layer A | Coating liquid formulation | Acrylate 1 | (parts by mass) | — | — | — | 100 | — |
| | | Acrylate 2 | (parts by mass) | — | — | — | — | 100 |
| | | Acrylate 3 | (parts by mass) | — | — | — | — | — |
| | | Urethane acrylate 1 | (parts by mass) | 100 | 100 | 100 | — | — |
| | | Polyurea compound 1 | (parts by mass) | — | — | — | — | — |
| | | 2-butanone | (parts by mass) | 900 | 900 | 900 | 900 | 900 |
| | | Omnirad 184 | (parts by mass) | 0.3 | 0.3 | 0.3 | 0.3 | 0.3 |
| | Structure R contained after curing | Structure r1 | (% by mass) | 15 | 15 | 15 | 4.5 | — |
| | | Structure r2 | (% by mass) | — | — | — | — | — |
| | | Structure r3 | (% by mass) | — | — | — | — | — |
| | | Structure r4 | (% by mass) | — | — | — | — | — |

TABLE 1-1-continued

| | | | Example 1 | Example 2 | Example 3 | Example 4 | Example 5 |
|---|---|---|---|---|---|---|---|
| | Structure r5 | (% by mass) | 36 | 36 | 36 | 11 | 6.9 |
| | Structure r6 | (% by mass) | — | — | — | — | — |
| | Structure r7 | (% by mass) | 16 | 16 | 16 | 4.8 | 0 |
| | Structure r8 | | — | — | — | — | — |
| | $W_R$ | (% by mass) | 64 | 54 | 64 | 19 | 6.9 |
| Presence or absence of resin contained after curing | Urethane acrylate polymer | | ○ | ○ | ○ | — | — |
| | Acrylate polymer | | ○ | ○ | ○ | ○ | ○ |
| | Aliphatic polyether | | — | — | — | — | — |
| | Aliphatic polyester | | ○ | ○ | ○ | — | — |
| | Polyurethane | | ○ | ○ | ○ | — | — |
| | Polyurea | | — | — | — | — | — |
| Substrate film | | | PPS film 1 | | | | |
| Resin layer A | | | Cured product of urethane acrylate 1 | | | Cured product of acrylate 1 | Cured product of acrylate 2 |
| Resin layer B | | | Polyphenylene sulfide | | | | |
| Film thickness | | (μm) | 4.4 | 4.5 | 5.3 | 4.5 | 4.5 |
| Thickness of resin layer A | | (nm) | 50 | 200 | 1000 | 220 | 180 |
| Thickness of resin layer B | | (μm) | 4.3 | 4.3 | 4.3 | 4.3 | 4.3 |
| Melting point of film | | (° C.) | 285 | 285 | 285 | 285 | 285 |
| Glass transition temperature of film | | (° C.) | 91 | 91 | 91 | 91 | 91 |
| XA | | (—) | 0.50 | 0.50 | 0.50 | 0.68 | 0.56 |
| Loss tangent | | (%) | 0.1 | 0.1 | 0.4 | 0.1 | 0.1 |
| Presence or absence of peak in pyrolysis GC-MS measurement | | (—) | ○ | ○ | ○ | ○ | ○ |
| Maximum peak intensity in pyrolysis GC-MS measurement | | (—) | 2000000 | 6000000 | 30000000 | 15000 | 80000 |
| 1% by mass decrease temperature of film | | (° C.) | 490 | 350 | 260 | 420 | 440 |
| 10% by mass decrease temperature of resin layer A | | (° C.) | 280 | 280 | 280 | 360 | 330 |
| Sa of α surface | | (nm) | 21 | 19 | 4 | 18 | 18 |
| Sa of β surface | | (nm) | 22 | 22 | 22 | 22 | 22 |
| Self-healing defect ratio | | (%) | 6 | 6 | 4 | 40 | 25 |
| Self-healing performance | | (—) | S | S | S | C | B |
| Dynamic friction coefficient μM | | (—) | 0.4 | 0.5 | 0.7 | 0.5 | 0.5 |
| Processability | | (—) | A | A | B | A | A |
| Film dielectric breakdown voltage at 150° C. | | (—) | S | S | A | S | S |
| Film capacitor characteristics | | (—) | S | S | C | C | B |

TABLE 1-2

| | | | | Example 6 | Example 7 | Example 8 | Example 9 | Example 10 |
|---|---|---|---|---|---|---|---|---|
| Resin layer A | Coating liquid formulation | Acrylate 1 | (parts by mass) | — | — | — | — | — |
| | | Acrylate 2 | (parts by mass) | — | — | — | — | — |
| | | Acrylate 3 | (parts by mass) | 100 | 100 | 100 | 100 | — |
| | | Urethane acrylate 1 | (parts by mass) | — | — | — | — | — |
| | | Polyurea compound 1 | (parts by mass) | — | — | — | — | 100 |
| | | 2 -butanone | (parts by mass) | 900 | 900 | 900 | 900 | 900 |
| | | Omnirad 184 | (parts by mass) | 0.3 | 0.3 | 0.3 | 0.3 | 0.3 |
| | Structure R contained after curing | Structure r1 | (% by mass) | — | — | — | — | — |
| | | Structure r2 | (% by mass) | — | — | — | — | — |
| | | Structure r3 | (% by mass) | — | — | — | — | — |
| | | Structure r4 | (% by mass) | — | — | — | — | — |
| | | Structure r5 | (% by mass) | 48 | 48 | 48 | 48 | — |
| | | Structure r6 | (% by mass) | — | — | — | — | — |
| | | Structure r7 | (% by mass) | 0 | — | — | — | 9 |
| | | Structure r8 | | — | — | — | — | 10 |
| | | $W_R$ | (% by mass) | 48 | 48 | 48 | 48 | 19 |
| | Presence or absence of resin contained after curing | Urethane acrylate polymer | | — | — | — | — | — |
| | | Acrylate polymer | | ○ | ○ | ○ | ○ | ○ |
| | | Aliphatic polyether | | ○ | ○ | ○ | ○ | — |
| | | Aliphatic polyester | | — | — | — | — | — |
| | | Polyurethane | | — | — | — | — | ○ |
| | | Polyurea | | — | — | — | — | ○ |
| | Substrate film | | | PPS film 1 | PPS film 2 | PPS film 3 | PES film 1 | PPS film 1 |
| | Resin layer A | | | Cured product of acrylate 3 | | | | Cured product of polyurea compound 1 |
| | Resin layer B | | | Polyphenylene sulfide | | | Polyethersulfone | Polyphenylene sulfide |
| | Film thickness | | (μm) | 4.5 | 4.5 | 4.5 | 6.7 | 4.5 |
| | Thickness of resin layer A | | (nm) | 160 | 160 | 160 | 160 | 200 |
| | Thickness of resin layer B | | (μm) | 4.3 | 4.3 | 4.3 | 6.5 | 4.3 |
| | Melting point of film | | (° C.) | 285 | 287 | 282 | — | 285 |

TABLE 1-2-continued

| | | Example 6 | Example 7 | Example 8 | Example 9 | Example 10 |
|---|---|---|---|---|---|---|
| Glass transition temperature of film | (° C.) | 91 | 91 | 91 | 225 | 91 |
| XA | (—) | 0.50 | 0.50 | 0.50 | 0.50 | 0.62 |
| Loss tangent | (%) | 0.1 | 0.1 | 0.1 | 0.4 | 0.1 |
| Presence or absence of peak in pyrolysis GC-MS measurement | (—) | ○ | ○ | ○ | ○ | ○ |
| Maximum peak intensity in pyrolysis GC-MS measurement | (—) | 200000 | 200000 | 200000 | 150000 | 500000 |
| 1% by mass decrease temperature of film | (° C.) | 370 | 370 | 370 | 390 | 360 |
| 10% by mass decrease temperature of resin layer A | (° C.) | 300 | 300 | 300 | 300 | 290 |
| Sa of α surface | (nm) | 18 | 3 | 350 | 18 | 18 |
| Sa of β surface | (nm) | 22 | 3 | 450 | 22 | 22 |
| Self-healing defect ratio | (%) | 14 | 12 | 12 | 14 | 8 |
| Self-healing performance | (—) | A | A | A | A | S |
| Dynamic friction coefficient μM | (—) | 0.5 | 0.9 | 0.4 | 0.5 | 0.5 |
| Processability | (—) | A | C | A | A | A |
| Film dielectric breakdown voltage at 150° C. | (—) | S | S | A | S | S |
| Film capacitor characteristics | (—) | A | C | C | C | S |

TABLE 2-1

| | | Comparative Example 1 | Comparative Example 2 | Comparative Example 3 |
|---|---|---|---|---|
| Resin layer A | | — | Polyethylene terephthalate | — |
| Resin layer B | | Polyphenylene sulfide | | Polypropylene |
| Film thickness | (μm) | 4.3 | 4.0 | 3.0 |
| Thickness of resin layer A | (nm) | — | 100 | — |
| Thickness of resin layer B | (μm) | 4.3 | 3.9 | 3.0 |
| Melting point of film | (° C.) | 285 | 285 | 165 |
| Glass transition temperature of film | (° C.) | 91 | 91 | — |
| XA | (—) | — | 0.85 | — |
| Loss tangent | (%) | 0.1 | 0.4 | 0.1 |
| Presence or absence of peak in pyrolysis GC-MS measurement | (—) | x | x | ○ |
| Maximum peak intensity in pyrolysis GC-MS measurement | (—) | — | — | 1000000 |
| 1% by mass decrease temperature of film | (° C.) | 490 | 450 | 340 |
| 10% by mass decrease temperature of resin layer A | (° C.) | — | 400 | — |
| Sa of α surface | (nm) | 22 | 30 | 29 |
| Sa of β surface | (nm) | 22 | 15 | 42 |
| Self-healing defect ratio | (%) | 85 | 63 | 5 |
| Self-healing performance | (—) | D | D | S |
| Dynamic friction coefficient μM | (—) | 0.4 | 0.4 | 0.5 |
| Processability | (—) | A | A | A |
| Film dielectric breakdown voltage at 150° C. | (—) | S | S | D |
| Film capacitor characteristics | (—) | D | D | D |

TABLE 2-2

| | | Comparative Example 4 | Comparative Example 5 |
|---|---|---|---|
| Resin layer A | | — | Cured product of acrylate 2 |
| Resin layer B | | Polyetherimide | |
| Film thickness | (μm) | 6.5 | 7.1 |
| Thickness of resin layer A | (nm) | — | 550 |
| Thickness of resin layer B | (μm) | 6.5 | 6.5 |
| Melting point of film | (° C.) | — | — |
| Glass transition temperature of film | (° C.) | 218 | 218 |
| XA | (—) | — | 0.56 |
| Loss tangent | (%) | 0.8 | 1 |
| Presence or absence of peak in pyrolysis GC-MS measurement | (—) | x | ○ |
| Maximum peak intensity in pyrolysis GC-MS measurement | (—) | — | 80000 |
| 1% by mass decrease temperature of film | (° C.) | 450 | 440 |
| 10% by mass decrease temperature of resin layer A | (° C.) | — | 330 |
| Sa of α surface | (nm) | 26 | 4 |
| Sa of β surface | (nm) | 30 | 4 |
| Self-healing defect ratio | (%) | 80 | 22 |
| Self-healing performance | (—) | D | B |

TABLE 2-2-continued

| | | Comparative Example 4 | Comparative Example 5 |
|---|---|---|---|
| Dynamic friction coefficient μM | (—) | 0.4 | 0.4 |
| Processability | (—) | D | D |
| Film dielectric breakdown voltage at 150° C. | (—) | S | S |
| Film capacitor characteristics | (—) | D | D |

Further, in Tables 1 and 2, the outermost layer surface of the resin layer A was defined as the α surface in Examples 1 to 10 and Comparative Examples 2 and 5, the surface on the side with lower Sa was defined as the α surface in Comparative Examples 3 and 4, and the wound inner surface was defined as the α surface in Comparative Example 1. The PPS film 4 is a laminated film of the PPS layer that is relatively large in thickness and the PET layer that is relatively small in thickness, and the substrate film (resin layer B) in Comparative Example 2 is thus the PPS layer part of the PPS film 4.

The film for film capacitors according to embodiments of the present invention can be applied to various applications such as packaging applications, tape applications, and electric applications including cable wrapping and capacitors, and can be used particularly for high-voltage capacitor applications that require withstand voltage and reliability at high temperatures.

The invention claimed is:

1. A film for film capacitors, comprising two types of resin layers that are different in thicknesses, wherein with the resin layer A of the two types of resin layers being a layer that is smaller in thickness and resin layer B thereof being a layer that is larger in thickness, the film for capacitors includes the resin layer A on at least one side of the resin layer B;

has an XA of 0.050 or more and 0.80 or less calculated based on the following formula (i) from atomic fractions for hydrogen atom H, carbon atom C, sulfur atom S, silicon atom Si, nitrogen atom N, and oxygen atom O contained in the resin layer A;

has a dielectric loss tangent of 0.50% or less measured at 10 KHz under an atmosphere at 23° C.; and satisfies at least one of the following conditions 1 and 2:

XA=(atomic fraction for carbon atom C+atomic fraction for nitrogen atom N+atomic fraction for sulfur atom S+atomic fraction for silicon atom Si)/(atomic fraction for hydrogen H+atomic fraction for oxygen atom O), Formula (i)

Condition 1: a melting point measured by DSC is at least 180° C., and

Condition 2: a glass transition temperature measured by DSC is at least 130° C. and not more than 370° C.

2. The film for film capacitors according to claim 1, wherein when the film is subjected to a pyrolysis GC-MS measurement at 400° C., the film has a peak with an intensity of 25000 or more in a section of 2 minutes or more and 20 minutes or less in retention time.

3. The film for film capacitors according to claim 1, wherein the film has a 10% by mass decrease temperature of 390° C. or lower when a rate of change in thermogravimetric weight of the resin layer A is measured at a heating rate of 10° C./min under a nitrogen atmosphere.

4. The film for film capacitors according to claim 1, wherein the film has a 1% by mass decrease temperature of 430° C. or lower when a rate of change in thermogravimetric weight is measured at a heating rate of 10° C./min under a nitrogen atmosphere.

5. The film for film capacitors according to claim 1, wherein the resin layer A includes any one of partial structures represented by structures r1 to r8 (n is an integer of 1 or more) as a constituent unit.

[Chemical Formula 1]

Structure r1

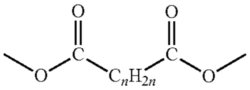

Structure r2

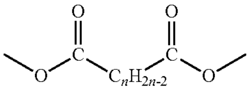

Structure r3

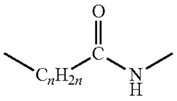

Structure r4

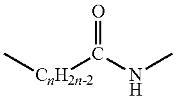

Structure r5

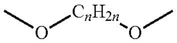

Structure r6

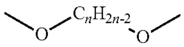

Structure r7

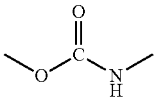

Structure r8

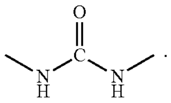

6. The film for film capacitors according to claim 1, wherein the resin layer A contains at least one compound selected from the group consisting of a urethane acrylate polymer, an acrylate polymer, a urethane methacrylate polymer, a methacrylate polymer, an aliphatic polyether, an aliphatic polyester, an aliphatic polyamide, a polyurethane, and a polyurea.

7. The film for film capacitors according to claim 1, wherein the resin layer B contains at least one of the group consisting of a polyarylene sulfide, a polyether sulfone, a polysulfone, and a polyimide in a total amount of 50% by mass or more and 100% by mass or less.

8. The film for film capacitors according to claim 1, wherein the resin layer A has a thickness of 1.0 nm or more and 500 nm or less.

9. The film for film capacitors according to claim 1, wherein at least one surface of the film has arithmetic mean roughness Sa of 5.0 nm or more and 1000 nm or less.

10. A metal laminate comprising a metal layer on at least one surface of the film for film capacitors according to claim 1.

11. The metal laminate according to claim 10, comprising the resin layer B, the resin layer A, and the metal layer in this order.

12. A film capacitor comprising the metal laminate according to claim 10.

13. A power control unit comprising the film capacitor according to claim 12.

14. An electric vehicle comprising the power control unit according to claim 13.

15. An electric aircraft comprising the power control unit according to claim 13.

* * * * *